(12) United States Patent
Lasak et al.

(10) Patent No.: US 10,841,490 B2
(45) Date of Patent: Nov. 17, 2020

(54) PROCESSING METHOD AND PROCESSING SYSTEM FOR VIDEO DATA

(71) Applicant: Fraunhofer-Gesellschaft zur Förderung der angewandten Forschung e.V., Munich (DE)

(72) Inventors: Martin Lasak, Berlin (DE); Louay Bassbouss, Berlin (DE); Stephan Steglich, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/609,555

(22) PCT Filed: Apr. 6, 2018

(86) PCT No.: PCT/EP2018/058926
§ 371 (c)(1),
(2) Date: Oct. 30, 2019

(87) PCT Pub. No.: WO2018/210485
PCT Pub. Date: Nov. 22, 2018

(65) Prior Publication Data
US 2020/0154044 A1     May 14, 2020

(30) Foreign Application Priority Data

May 15, 2017  (DE) .......................... 10 2017 110 506
Nov. 1, 2017  (DE) .......................... 10 2017 125 544

(51) Int. Cl.
*H04N 5/232*      (2006.01)
*H04N 21/6587*    (2011.01)
*H04N 21/81*      (2011.01)

(52) U.S. Cl.
CPC ..... *H04N 5/23238* (2013.01); *H04N 21/6587* (2013.01); *H04N 21/816* (2013.01)

(58) Field of Classification Search
CPC ........... H04N 5/23238; H04N 21/6587; H04N 21/816
See application file for complete search history.

(56) References Cited

U.S. PATENT DOCUMENTS

| 6,956,573 | B1  | 10/2005 | Bergen et al. |
| 2003/0011750 | A1* | 1/2003 | Tzidon ..................... H04N 5/74 353/30 |
| 2015/0346812 | A1  | 12/2015 | Cole et al. |

OTHER PUBLICATIONS

Bassbouss et al., "High Quality 360° Video Rendering and Streaming", 2nd International Conference on 3D Vision, 2016, 4 pages, vol. 1.

(Continued)

*Primary Examiner* — Mishawn N. Hunter
(74) *Attorney, Agent, or Firm* — The Webb Law Firm (57) ABSTRACT

It is provided a processing method for video data that can be displayed on at least one display device. A predetermined quantity of static fields of view (FOV) datasets from the video data are precalculated and stored, video data for the temporal transitions between the stored, static FOV data sets are further calculated and stored as dynamic FOV datasets (transition data), wherein, immediately or at a later point in time, a static or dynamic initial FOV and a static or dynamic target FOV are specifically selected for this purpose, in particular by a user, and the video data corresponding in time to the selected FOV datasets, including the dynamic transition data between the initial FOV and the target FOV can be streamed or are streamed.

12 Claims, 3 Drawing Sheets

(56) References Cited

OTHER PUBLICATIONS

Chen, "QuickTime® VR—An Image-Based Approach to Virtual Environment Navigation", SIGGRAPH 95 Conference Proceedings, Aug. 6, 1995, pp. 29-38.

D'Acunto et al., "Using MPEG DASH SRD for zoomable and navigable video", MMSys2016: Proceedings of the 7th International Conference on Multimedia Systems, 2016, 4 pages, Article No. 34.

Le Feuvre et al., "Tiled-based Adaptive Streaming using MPEG-DASH", MMSys2016: Proceedings of the 7th International Conference on Multimedia Systems, 2016, 1 page, Institut Mines-Télécom, France.

Lim et al., "Tiled panoramic video transmission system based on MPEG-DASH", 2015 International Conference on Information and Communication Technology Convergence (ICTC), 2015, pp. 719-721.

Miller et al., "The Virtual Museum: Interactive 3D-Navigation of a Multimedia Database", The Journal of Visualization and Computer Animation, 1992, pp. 183-197, vol. 3, No. 3.

Van Brandenburg et al., "Spatial Segmentation for Immersive Media Delivery", 15th International Conference on Intelligence in Next Generation Networks, 2011, pp. 151-156.

"Group of pictures", Wikipedia, Dec. 28, 2016, Retrieved from http://de.wikipedia.org/w/index.php (accessed on Feb. 21, 2018).

\* cited by examiner

PROCESSING METHOD AND PROCESSING SYSTEM FOR VIDEO DATA

CROSS-REFERENCE TO RELATED APPLICATIONS

This application is the United States national phase of International Application No. PCT/EP2018/058926 filed Apr. 6, 2018, and claims priority to German Patent Application Nos. 10 2017 110 506.9 filed May 15, 2017, and 10 2017 125 544.3 filed Nov. 1, 2017, the disclosures of which are hereby incorporated by reference in their entirety.

BACKGROUND OF THE INVENTION

Fundamentally speaking, two approaches exist for seamless transitions between perspectives (fields of view, (FOV)) in videos, which make a repeated recalculation (i.e. a calculation in real time) necessary.

The forms of embodiment proposed here propose a further approach in which the calculation in real time is omitted in that the corresponding video data are precalculated and reused.

A perspective change is the change in the field of view, in particular in 360°/panorama videos, or between partial regions in an altogether larger image region of a plane video, or an alternative sequence of a plurality of videos with the same start point.

PRIOR ART

Figures 1A, 1B:
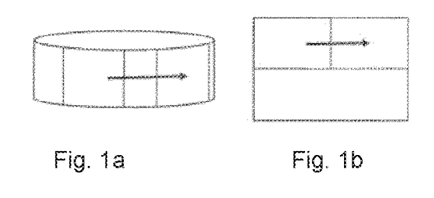
FIG. 1a shows a spherical, cylindrical.
FIG. 1b shows a plane and FIG. 1c shows an alternative path.
Figure 1C:
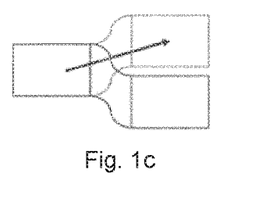

One approach starts from the preparation of a (source) video or a set of logically coherent source videos (e.g. from an all-round vision, multi-camera system) by means of calculation/determination of the video data of the perspective change (transition from an initial perspective (initial FOV) to a target perspective (target FOV) from the source material (full video material) in the backend (server), and the transmission of the rendered video data to the video clients (clients). The preparation can consist of pivoting the angle of view in the spherical or cylindrical source video (FIG. 1a) or a position change of the image segment in the plane source video (FIG. 1b) or, however, the selection of an alternative path from a plurality of source videos (FIG. 1c).

After the calculation/determination, the video data corresponding to the perspective change and the video data corresponding to the target FOV are transmitted in an appropriate format to the client. As a result of the dynamic preparation (calculation/determination and encoding), with this approach a session and appropriate resources, which must be held available, are required in each case for every client. This has the consequence that with a growing number of clients this approach does not scale well (scalability problem).

In another approach, which is used more frequently nowadays, the complete video material is transmitted to the client, which calculates/determines the video data for the respective FOV and the perspective transitions from this. Because with this approach image regions of the video that are visible, as well as those that will finally not be visible, are both transmitted to the client, bandwidth is used unnecessarily, or a higher bandwidth is necessary for the data transmission for a constant image quality (resolution) of the FOV. In addition, the source video or source videos (the complete source material each case) must be prepared/rendered by the client, so that, an increased resources demand (memory/CPU/GPU, energy) is placed upon the client in addition to the higher data transmission. In some cases, not all the end devices such as, for example, televisions or smartphones, are fitted with the necessary graphics processor and computing capacity in order to perform at all the preparation of the e.g. spherical video for a seamless transmission when changing perspective (problem of high resource demand).

At present, spherical 360° videos are transmitted with the same method as is employed when streaming conventional videos. Although about 90% of the 360° video image lies outside the visible window of the individual user, these are nevertheless transmitted to the client. This means that the majority of the video content streamed over the Internet to the user is abandoned unseen, and bandwidth and resources are thereby consumed unnecessarily.

The calculation of the field of view (FOV) at the client also needs more resources (CPU and GPU) in comparison with playing back classic videos. As mentioned further below, various attempts exist from research and standardization for reducing the use of unnecessary bandwidth and processor capacity.

Demands

The following seven demands are taken into account in order to be able to compare the individual potential solutions to one another.

A1: Only stream the required field of view (FOV) to the client: The client only receives the video content that will be shown to the user, and therefore no bandwidth and resources are consumed unnecessarily.

A2: Applicable adaptive bitrate streaming: Similar to conventional video streaming, it is important that it is possible to transmit a single FOV at different bitrates (quality profile), and that the clients can select the most appropriate adaptation set. This depends on various factors such as the available bandwidth and the resources available on the playback device. Many of the existing 360° video approaches support adaptive streaming in that they use DASH or HLS. At present, however, this approach is applied to the total 360° video (complete source material) instead of only to the required FOV.

A3: Reproduction without additional processing by the client: For the reproduction of 360° videos, the respective fields of view must be calculated from the video source before the data are transmitted to the reproduction device. The processing load depends on various factors such as the projection method used (equirectangular, cubic, cylindrical), the video resolution and the image rate. Reproduction without additional processing at the client makes it possible for limited devices and devices with limited programming functions to also play 360° contents back in a similar way to conventional videos.

A4: Streaming without additional processing at the server: The processing in the calculation of the necessary FOV video data can also take place on the server or any other network node in real time instead of the client. This, however, has an effect on the scaling if the system is available for a large number of users. Highly scalable 360° streaming is given when no elaborate processing is necessary for each client in real time.

A5: Use of content delivery networks Content delivery networks (CDNs) transmit contents to an end user with high availability and high performance. Media objects can be stored temporarily in the network at distributed nodes to avoid always streaming the contents directly from the originating source server. Content queries are usually transmitted algorithmically to the nodes that are most appropriate for making the content available. It is also important to profit from CDNs for the replay of 360° videos. This means that the 360° video must be prepared in such a way that it can be transmitted via CDNs. A direct connection between clients and the originating rendering server (source server) that is necessary for a client-specific preparation of the video on the server in real time is not possible if a CDN is used.

A6: Smooth transition at a perspective change: When a user navigates in a 360° video, it is very important from the user side that the change in the field of view takes place smoothly (perspective transition that simulates a rotation). A hard change (cut without transition) between the two fields of view has a negative effect on the perceived quality.

A7: No distortions in the visible FOV: Different qualities are achieved, depending on the projection types, the methods used to record and cut the video, and on the dimensions of the visible FOV. The least possible distortion, or even none at all, should be perceptible in the display of the video image in order to achieve a best possible quality.

All the currently known approaches for the transmission of a field of view either infringe the criterion of efficient use of resources on the client side or the criterion of scalability on the server side. In the first case, the client must process the received content before display in order to calculate the desired field of view. This has effects on battery life, performance and usability, and is particularly significant in the case of devices with limited resources. In the second case, a video encoder must be maintained on the server side for each client for the calculation of the field of view. As a rule this has the consequence of high costs, and usually scales badly as the number of clients grows.

Approaches that exist already (L1, L2, L3) and the solution presented here (L4) are classified and evaluated in relation to the demands A1 to A7 discussed above.

L1: Source material is transmitted to the client completely, and the processing is carried out on the client. Examples: YouTube and Facebook 360° players.

L2: 360° video is divided into tiles that are prepared for different bitrates. Depending on the current FOV, the tiles that are needed for the calculation of the current FOV are requested from the server at a higher bitrate, and the rest at a lower bitrate. The client must assemble the tiles and calculate the FOV. Examples: HEVC tiles.

L3: The video is processed individually on the server, and only the required field of view streamed to the client. This can be played back without any further processing in the same player as conventional videos. Examples: Fraunhofer FOKUS Cloud 360° Video Playout.

L4: Calculate a sufficiently large number of different static and dynamic FOV data sets from the source material in advance and store them. While streaming, the sections of the FOV data sets that have already been calculated and that are stored on the server required at any time in accordance with the temporal sequence are transmitted to the client. A calculation is therefore neither necessary on the server nor on the client at this point in time. There is also no unnecessary bandwidth, since only the data for the required FOV is transmitted to the client.

Table 1 evaluates the existing approaches in terms of the demands that have emerged.

TABLE 1

|    | L1 | L2 | L3 | L4 |
|----|----|----|----|----|
| A1 | -- | -  | ++ | ++ |
| A2 | -  | ++ | ++ | ++ |
| A3 | -- | -- | ++ | ++ |
| A4 | ++ | -  | -- | ++ |
| A5 | ++ | ++ | -- | ++ |
| A6 | ++ | ++ | ++ | ++ |
| A7 | ++ | ++ | ++ | ++ |

SUMMARY OF THE INVENTION

Solutions with which good scalability is in particular ensured for the server and client systems are required.

The processing method with features as described herein provides such a solution.

Here, in a first step, a predetermined quantity of static FOV datasets from (more comprehensive) video source material are precalculated and stored. The static FOV data sets show fields of view (FOVs) according to a fixed direction of view.

In addition, temporal transitions between the stored, static FOV datasets are calculated from the video source material and stored, which, as dynamic FOV datasets, form transition data. Video data that could form transitions between two FOVs are thus stored in advance.

Here, a static or dynamic initial FOV dataset and a static or dynamic target FOV dataset are specifically selected, immediately or at a later point in time, in particular by a user, indirectly through the choice of the corresponding FOV. The initial FOV and the target FOV specify the start and end points between which the dynamic FOV datasets are inserted.

The video data corresponding in temporal sequence to the selected FOV datasets, including the dynamic transition data between the initial FOV and the target FOV, are streamed or can be streamed. This means that the video data can be streamed immediately or following intermediate storage of the selected static and/or dynamic FOV (partial) datasets and the corresponding dynamic transition data (also as one or a plurality of FOV (partial) datasets).

The video stream can here be displayed, in particular on the display device, in particular a client.

In one form of embodiment, to reduce the quantity of data to be transmitted only the respective video data of the initial FOV dataset, the target FOV dataset and the dynamic transition data required at the time are streamed or can be streamed.

So that the data can also be accessed quickly for a larger number of users with clients, in one form of embodiment the precalculated static FOV datasets and the precalculated dynamic transition data datasets are stored redundantly on a server system, in particular a distributed server system. The server system can, in particular, be constructed in a geographically distributed form, wherein the datasets are at least partially redundantly stored thereon.

The dynamic transition data can be selected from a quantity of dynamic FOV data sets, which each cover a predetermined region, in particular an angular region or solid angular region. It is also possible for the user to make a direct, sudden jump to a (different) FOV without the intermediate views first being played back. The granularity of the possible FOVs is determined by the number of stopping points, e.g. these correspond in a spherical projection to the number of all the discrete angle positions of the (virtual) camera (which in turn corresponds to the number of static FOVs). The higher the number, the more dynamic FOV datasets must be kept ready.

The position, in particular the standpoint and/or the direction of view of a virtual observer in the initial FOV and the target FOV, can furthermore be different.

The display device can, in one form of embodiment, comprise at least a flat screen, at least a curved panoramic screen, a hemispherical projection surface, a head-mounted display and/or a fulldome projection surface.

The object is also achieved by a processing system for video data with features as described herein.

One means serves here for the precalculation and storage of a predetermined quantity of static FOV datasets from the video source material, and one means serves for the calculation and storage of dynamic FOV datasets as transition data for the temporal transitions of the stored static FOV datasets. Elaborate recalculations are avoided with this pre-rendering. Following this, access is made whenever necessary to these stored FOV datasets.

With a means for the targeted, indirect selection of a static or dynamic initial FOV dataset and of a static or dynamic target FOV dataset, in particular by means of an interaction such as e.g. the press of a button initiated by a user, which signals, for example, a change in direction or the end of a change in direction, or a change in the position or of the direction of view in real space, these datasets are indirectly and specifically selected. The user can select specific perspectives (FOVs) from the totality of precalculated video data (FOV datasets) in various ways.

One means then serves to stream in temporal sequence the video data corresponding to the selected FOV data sets, including the dynamic transition data between the initial FOV and the target FOV.

The display can in particular take place on a display device, in particular with a client.

In one form of embodiment, some or all of the means of the processing system are disposed on different computers.

The object is also achieved by a client device with features as described herein.

BRIEF DESCRIPTION OF THE DRAWINGS

Forms of embodiment are described with reference to the drawings.

FIGS. 1a to 1c: show perspective changes in the source video, where

DESCRIPTION OF THE INVENTION

The method and system presented here with reference to forms of embodiment enable, amongst other things, the degrees of freedom of the perspective change in videos to be specified meaningfully and efficiently, so that a one-off preparation of the video material in the backend is sufficient to then serve an arbitrary number of video clients via a content delivery network (CDN).

This efficiency can result from a restriction, since in many scenarios the unrestricted number of degrees of freedom for a change to the FOV (perspective change) is not entirely necessary. The restriction can be parameterized with three values.

$P_N$: Number of static FOVs $T_N$: Number of possible adjacent FOVs for seamless transition $t_G$: Smallest temporal unit of a stand-alone video segment, usually the length of a segment or "group of pictures (GOP)"

In a preparatory process, a maximum of $P_N*(T_N+1)$ videos are calculated, wherein it is possible to change between these at the time points $T_0+n*t_G$ where $n>=0$ ($T_0$=start of the video). At the request of the client, the precalculated videos are combined at specific locations/time points to form the finished video/video stream and replayed. The combination can either take place at the backend or be performed at the client, while the combination takes place by means of file copying operations and without recoding the video. The demands of the client are thus the same as those for playing back classic videos/video streams (e.g. on a smartphone). Only video data that will in fact be shown are transmitted. In addition, the videos prepared once in the preprocessing phase are available to all clients.

Figure 3:
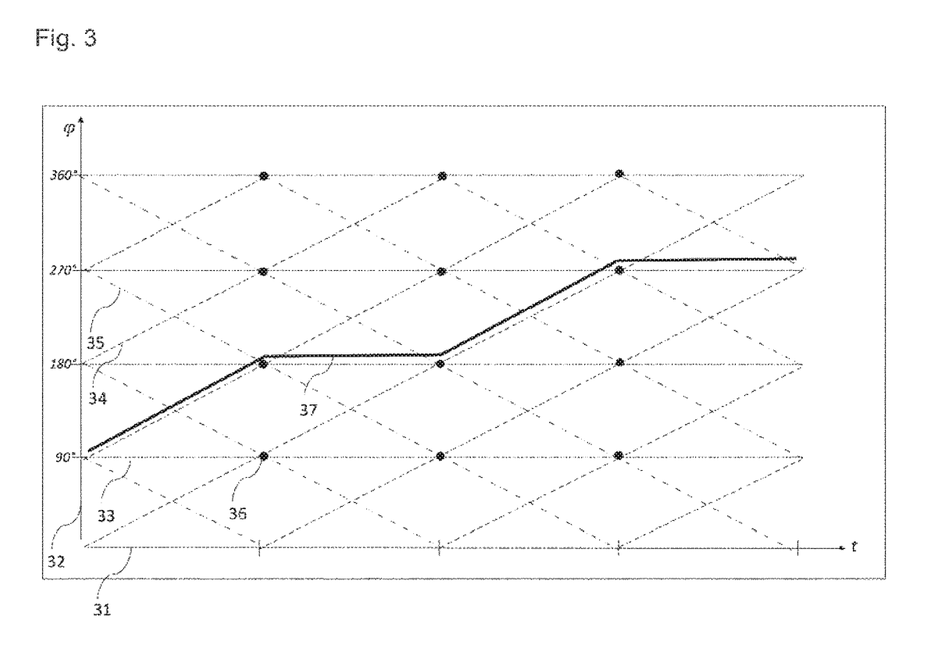
FIG. 3: shows an illustration of a simplified configuration with temporal sequences of static FOVs (33 horizontal sections) and dynamic FOV process (34, 35 diagonal sections), the possible transition points (36) and an emphasized sequence of a user session (37)
Figure 4:
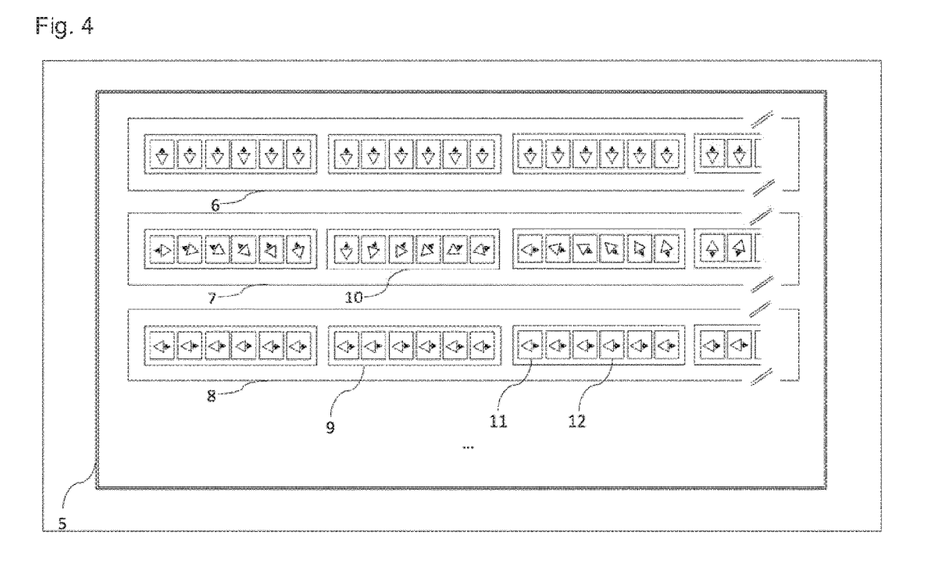
FIG. 4: shows a schematic illustration of a server with pre-stored data sets for static and dynamic FOVs.
Figure 5:
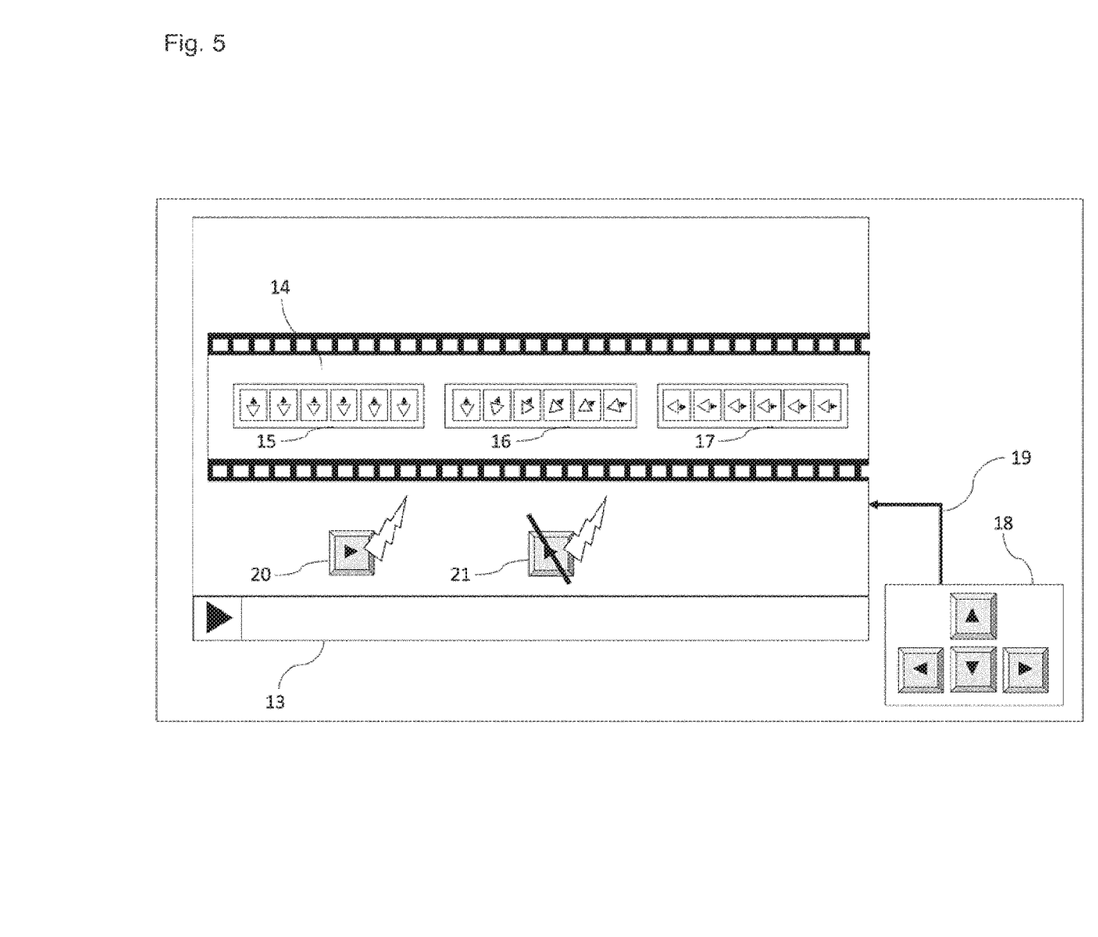
FIG. 5: shows a schematic illustration of a selection of an initial FOV dataset, a target FOV dataset and a dynamic transition dataset.

In one form of embodiment, the technical mechanism comprises the following steps, which are explained in association with FIGS. 3 to 5.

a) Preprocessing and calculating the static FOV datasets

A reprocessing of the source video (e.g. of a spherical video) takes place for this purpose, and all the video data necessary for the transmission and display are generated in the backend (solution to the scalability problem)

A fixed number of static FOVs $P_N$ is specified.

A static FOV is characterized in that the (virtual) camera has, in the preprocessing process (or in the generation process in the case of computer animated material) a fixed location in space and a fixed direction of view 33 throughout and beyond the entire recording time 31 (i.e. along the t-axis).

It has been found to be advantageous for universal FOV changing (perspective changing), if the static FOVs—considered separately at least in each direction (e.g. horizontal, vertical . . . )—are arranged at regular distances from one another. Other arrangements are, however, possible, and can be appropriate, depending on the intended purpose and on the video contents.

b) Calculation of the temporal transitions (dynamic FOV datasets) between stored, static FOV datasets A precalculation of all video sequences with dynamic FOVs between the static FOVs is performed repeatedly with the interval $t_G$. The precalculation takes place through a transition, i.e. movement of the position and/or alignment of a virtual or a real camera over time.

As a rule, camera pans with a fixed speed and fixed angle are well-suited for universal FOV changes in videos, but can also be individually specified for each video and each video scene. Camera tracking shots with a fixed speed along a straight line are as a rule well-suited for universal changing of the FOVs in videos for projection on plane surfaces. Other variants, e.g. a rising or falling speed, or an irregular curved motion, are also possible.

Which video (i.e. which dynamic FOV dataset) must be used for the replay for a concrete perspective change emerges from the initial direction of view of the (virtual) camera and the number of intervals $t_G$ that have passed.

These steps a) and b), in which all the videos (FOV datasets) are precalculated as stated, are to be referred to as the prerendering process. The prerendering process can be applied both to persistent contents (on-demand content) as well as to live content with a small delay. The prerendering can, in principle, be carried out at any arbitrary point in time. It only has to be carried out once. The following steps then use these precalculated FOV data sets.

The precalculated video material from the prerendering process is made available completely (for on-demand content) or progressively (for live content) in a CDN/storage server 5, which is illustrated in FIG. 4.

The CDN/storage server 5 here has datasets for static FOVs 6, 8, as well as a dynamic FOV 7. Individual partial sections 9, 10 of the videos with different FOVs (organized into GOPs or segments) are arranged in the datasets 6, 7, 8. The static FOVs 6, 8 are recognizable in FIG. 4 in that the direction of the arrow for the partial section 9 for the fixed direction of view 4 is unchanged in each of the symbolically illustrated data sets 6, 8. In the symbolically illustrated dataset for the dynamic FOVs 7, partial sections 10 with different directions of view are contained in the dataset.

The datasets 6, 7, 8 on the CDN/storage server 5 are thus available for an arbitrary call and for the following step of replay (steps d), e)) in a total video.

c) Selection of the initial and target FOV

On the basis of the previously stored, static and dynamic FOV datasets, the actual reproduction can now be started. A static or dynamic initial FOV and a static or dynamic target FOV are specifically selected for this purpose, in particular by a user.

For this purpose, a client which has, for example, a data exchange connection with the CDN/storage server 5 can perform a change of the FOV at time points $(n*t_G)$ with a fixed definition, in that a precalculated video is continued with a dynamic FOV change 16 (see FIG. 5).

The change is initiated here by a user interaction, e.g. through a button press or another input method.

The precalculated FOV datasets (see FIG. 4) are thereupon called, so that no computationally intensive recalculation (re-encoding) is necessary. The precalculated datasets 6, 7, 8 are put together in such a way that they merge into one another at appropriate transition points (cut by means of file copying operation).

In addition to navigation by means of remote control as illustrated in FIG. 5, any other suitable forms of navigation such as the movement (repositioning, swiveling on the spot . . . ) of a mobile device in space is possible. In these cases, changes of the FOV other than exclusively horizontal and vertical are possible if suitable video datasets 6, 7, 8 are stored in advance. Otherwise, an approximation to the change of the FOV takes place through the suitable combination of horizontal and vertical change of the FOV ("sawtooth perspective change").

d) Streaming the video data

The video data (FOV partial datasets) corresponding in time to the selected FOV data sets, including the dynamic transition data between the initial FOV and the target FOV are then streamed to the client in the correct sequence to the client. The already precalculated and stored FOV datasets are accessed here.

FIG. 5 shows how, after the selection of an initial data set 15 and the target FOV dataset 17, a dynamic FOV dataset 16 is inserted in whose segments the direction of view 4 changes successively. The streaming of the datasets 15, 16, 17 to the video client 13 is symbolized by the filmstrips 14.

The video sequences (static FOV datasets and dynamic FOV datasets) are here synchronized in such a way that seamless changes between the video sequences are possible at points with fixed definition in the temporal sequence (transition points). For this purpose, the positions of all the time points $n*t_G$ (36 in FIG. 3) in the videos are registered (e.g. through byte offsets or storage in separate files).

The calculation for concatenation, which requires relatively little computation, of the resulting video (37 in FIG. 3) is carried out for each video client 13 after the call from the CDN/storage server 5 in the backend or by each video client 13 itself.

e) Display of the video

The video client 13 then begins (at time $T_0$) a session with the replay of an arbitrary, precalculated static FOV dataset 15.

At an arbitrary point in time $(T_0+m*t_G)$ the user initiates the change from a static to a dynamic FOV (e.g. through a button push 20).

At an arbitrary later point in time $(T_0+n*t_G, m<n)$ the video client 13 can continue the playback of a precalculated static FOV dataset 17 or of a different dynamic FOV dataset 16. The change can, for example, be initiated by a user event (e.g. releasing a button 21). The procedure repeats itself from the beginning until the end of the streamed video 14.

The value $t_G$ is a fixed interval size that is defined during the prerendering by the "configurator", or by a customer request; the size is determined here through a correspondence to or a multiple of the length of a group of pictures (GOP) or of another technical segment length at the creation of the video. The exemplary products $m*t_G$ and $n*t_G$ are discrete time points on the time scale of the precalculated video at which a direct switch is possible without having to recode the video data. FIG. 3 illustrates possible switchover possibilities 36 at the time points where two videos, each of which has been precalculated, "intersect", i.e. the point in time and the orientation are identical, and can be simply joined together.

An endless number of possibilities in a spherical video can be reduced in this way to a reasonable measure.

Figure 2:
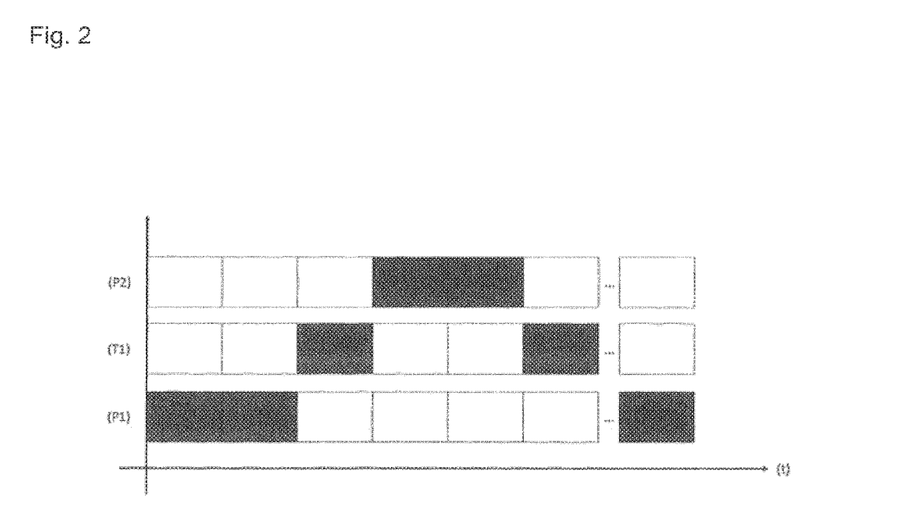
FIG. 2: shows an exemplary replay of precalculated static FOV (partial) datasets (P1, P2), and a dynamic FOV (partial) dataset (T1) against time t.

FIG. 2 illustrates, by way of example and limited to two static FOV datasets and one dynamic FOV dataset, the temporal sequence of the method of replay.

The video client 13 begins the reproduction with a static FOV P1 and, after the time interval $2*t_G$, inserts the transition with the change to the dynamic FOV T1, which lasts for one time interval. This is followed by the reproduction of the second static FOV dataset P2. In the case of cylindrical or spherical source material, a different but fixed camera perspective can be adopted in each case for P1 and P2, and sequential alternating transitions (camera pans) from one perspective to the other and back again for T1. In a similar way, in the case of plane, wide source material, P1 is taken as the left-hand image segment and P2 as the right-hand image section, and T1 displays the transitions from left-to-right and right to left in alternation for this. A wide-angle recording can also be adopted for P1 and a close-up recording of the same scene for P2, each with alternating transitions T1 (zoom in, zoom out).

A typical value for $t_G$ which can be used effectively for perspective change is 333 ms (corresponding to a GOP length of 10 at 30 frames per second). With this value, the user is able to redetermine the change of the FOV (perspective change) 3 times per second. The time interval $t_G$ can, however, also adopt other values, although it is important that this interval can then be used in all the precalculated videos as the base value for the GOPs or segments. $t_G$ accordingly determines the playback time of a GOP or of a segment.

The effect of the described method is to enable seamless transitions between perspectives, i.e. FOVs in videos for the observer. The advantage consists in that due to the preprocessing (steps a), b) above) the method scales efficiently, and the demands of the end device during replay remain low for a high quality reproduction.

Examples for the use of the processing method for video data are:

Efficient and scalable (live) streaming of 360° panoramic videos for entertainment (film, documentation, events), security technology Interactive video, panning/shifting/slewing in a very high-resolution source video For example: 16K 360° video streaming An application of one of the forms of embodiment, namely "streaming and playback of 16K 360° videos", is presented below.

The conventional approaches, which stream the complete 16K 360° source video to the video client 13, need a bandwidth of about 320 Mbit/s. The video client 13 must in this case also carry out the calculation of the FOV frames from the frames of the source video. Even on PCs with up-to-date hardware, this calculation takes several seconds in the case of 16K source videos, i.e. playback in real time is not possible. It is expected in the case of the video with a frame rate of 30 frames per second that the geometric transformation must be at least as fast as the original frame rate of the source video in order to enable smooth playback. Tests show that the calculation of one frame takes about 8 seconds. For the calculation of 30 frames, that is one second of video, the process therefore takes about 240 seconds.

In one form of embodiment of the above-described method, the FOV datasets are precalculated in 4K quality from the 16K source video, and stored on a storage server. For the streaming, the video client 13 requests the corresponding segments (i.e. datasets 6, 7, 8) from the precalculated FOV video. The server 5 only delivers the 4K FOV (partial) dataset that is visible at the time to the client 13. The bandwidth required is about 20 Mbit/s. In contrast to conventional approaches, the video client does not have to carry out a geometric transformation in the solution presented here, and a smooth, problem-free playback is thus ensured. The user experience is thus supported optimally and efficiently through the processing method for video data.

The invention claimed is:

1. A processing method for video data that can be displayed on at least one display device, comprising the following steps:
    a) a predetermined quantity of static fields of view (FOV) datasets from the video data are precalculated on a server and stored on a content distribution network (CDN),
    b) video data for the temporal transitions between the stored, static FOV data sets are further calculated on the server and stored on the CDN as dynamic FOV datasets (transition data), wherein, immediately or at a later point in time,
    c) a static or dynamic initial FOV and a static or dynamic target FOV are specifically selected for this purpose, in particular by a user, and
    d) the video data corresponding in time to the selected FOV datasets, including the dynamic transition data between the initial FOV and the target FOV can be streamed or are streamed from the CDN to the at least one display device.

2. The processing method as claimed in claim 1, wherein the video data, including the dynamic transition data, can be displayed or are displayed on the display device, in particular a client.

3. The processing method for video data as claimed in claim 1, wherein only the video data corresponding in time to the initial FOV dataset, the target FOV dataset and the dynamic transition data can be streamed or are streamed.

4. The processing method for video data as claimed in claim 1, wherein the precalculated static FOV datasets and the precalculated dynamic transition data sets are stored on a server system, in particular a distributed server system.

5. The processing method for video data as claimed in claim 4, wherein the server system is constructed in a geographically distributed form, and the datasets are at least partially redundantly stored thereon.

6. The processing method for video data as claimed in claim 1, wherein the dynamic transition data can be selected from a dataset that covers a predetermined region, in particular an angular region or solid angular region.

7. The processing method for video data as claimed in claim 1, wherein the position, in particular the standpoint and/or the direction of view of a virtual observer in the initial FOV and the target FOV, is different.

8. The processing method for video data as claimed in claim 1, wherein the display device comprises at least a flat screen, at least a curved panoramic screen, a hemispherical projection surface, a head-mounted display and/or a full-dome projection surface.

9. A client device configured and designed for use in the processing method as claimed in claim 1, in particular with a means for the targeted selection of an initial FOV and a target FOV.

10. A processing system for video data that can be displayed on at least one display device, comprising
    a server means for precalculating and storing a predetermined quantity of static FOV datasets from the video data on a content distribution network (CDN),
    the server means for further calculating and storing on the CDN dynamic FOV datasets as transition data for the temporal transitions of the stored static FOVs,
    means for the targeted selection of a static or dynamic initial FOV and a static or dynamic target FOV, in particular by a button that can be pressed by a user, in the at least one display device, and
    means for streaming the video data between the server means and the at least one display device corresponding in time to the selected FOV data sets, including the dynamic transition data between the initial FOV and the target FOV.

11. The processing system as claimed in claim 10, further comprising a display device, in particular in a client.

12. The processing system as claimed in claim 10, wherein at least one of
    the means for precalculating and storing a predetermined quantity of static FOV datasets from the video data,
    the means for calculating and storing dynamic FOV datasets as transition data for the temporal transitions of the stored static FOVs,
    the means for the targeted selection of a static or dynamic initial FOV and a static or dynamic target FOV, in particular by a button that can be pressed by a user, and the means for streaming the video data corresponding to the selected FOV data sets, including the dynamic transition data between the initial FOV and the target FOV, are disposed in a manner distributed over different computers.

* * * * *